United States Patent
Nakashima et al.

[11] Patent Number: 5,931,546
[45] Date of Patent: Aug. 3, 1999

[54] VEHICLE MOTION CONTROL SYSTEM

[75] Inventors: Hiroshi Nakashima, Nishio; Toshiaki Hamada, Okazaki; Jun Mihara, Toyoake, all of Japan

[73] Assignee: Aisin Seiki Kabushiki Kaisha, Kariya, Japan

[21] Appl. No.: 08/957,461

[22] Filed: Oct. 24, 1997

[51] Int. Cl.⁶ ........................................ B60T 8/32
[52] U.S. Cl. .................. 303/146; 303/147; 303/122.05; 701/72
[58] Field of Search .................. 303/122.03, 122.05, 303/122.04, 122.06, 122.07, 140, 147, 146; 701/76, 92, 43, 72

[56] References Cited

U.S. PATENT DOCUMENTS

| | | | |
|---|---|---|---|
| 5,645,326 | 7/1997 | Sano | 303/46 |
| 5,702,165 | 12/1997 | Koibuchi | 303/146 |
| 5,709,439 | 1/1998 | Monzaki | 303/146 |
| 5,711,585 | 1/1998 | Tozu et al. | 303/146 |
| 5,722,743 | 3/1998 | Sano | 303/146 |

FOREIGN PATENT DOCUMENTS 8-142846  6/1996  Japan .

Primary Examiner—Douglas C. Butler
Attorney, Agent, or Firm—Burns, Doane, Swecker & Mathis, L.L.P.

[57] ABSTRACT

A vehicle motion control system for a vehicle for maintaining stability of a vehicle when the vehicle is in motion includes braking device for applying a braking force to each wheel of the vehicle. The system includes a lateral acceleration sensor for sensing a lateral acceleration of the vehicle and a yaw rate sensor for sensing a yaw rate of the vehicle. A vehicle slip angular velocity is calculated on the basis of output signals of the lateral acceleration sensor and the yaw rate sensor and then a vehicle motion condition is determined on the basis of the vehicle slip angular velocity. The braking device is actuated to apply a braking force to at least one of the wheels on the basis of the vehicle motion condition and irrespective of depression of the brake pedal in order to maintain the stability of the vehicle in motion. An abnormal condition of at least one of the lateral acceleration sensor and the yaw rate sensor is determined on the basis of the vehicle slip angular velocity.

16 Claims, 9 Drawing Sheets

VEHICLE MOTION CONTROL SYSTEM

FIELD OF THE INVENTION

The present invention generally relates to a vehicle motion control system for controlling vehicle motion. More particularly, the present invention pertains to a vehicle motion control system for controlling vehicle motion to apply a braking force to at least one wheel of the vehicle in order to maintain stability of the vehicle in motion irrespective of brake pedal depression.

BACKGROUND OF THE INVENTION

A conventional vehicle motion control system in disclosed in Japanese Laid-Open Publication No. 8-142846. The system includes a braking device for applying a braking force to each wheel of the vehicle. The system further includes a lateral acceleration sensor for sensing the lateral acceleration of the vehicle and a yaw rate sensor for sensing the rate of the vehicle. A vehicle slip angular velocity is calculated on the basis of output signals of the lateral acceleration sensor and the yaw rate sensor and then a vehicle slip angle is calculated on the basis of the vehicle slip angular velocity. A vehicle motion is determined based on the vehicle slip angular velocity and the vehicle slip angle. That is, it is determined whether or not an excessive oversteer of the vehicle exists based on the vehicle slip angular velocity and the vehicle slip angle.

A motion control device actuates the braking device to apply a braking force to at least one of the wheels on the basis of the vehicle motion and irrespective of depression of the brake pedal in order to maintain stability of the vehicle in motion. More particularly, when excessive oversteer occurs during cornering, a braking force is applied to a front wheel on the outside of the curve in order to restrain the oversteer.

However, since the system does not detect abnormal conditions of the lateral acceleration sensor and the yaw rate sensor, the vehicle motion is inaccurately controlled when at least one of the sensors is experiencing an abnormal condition. Therefore, it is necessary to determine whether or not an abnormal condition exists in at least one of the lateral acceleration sensor and the yaw rate sensor.

SUMMARY OF THE INVENTION

A need exists, therefore, for a vehicle motion control system which addresses at least the foregoing drawbacks in known systems.

It would be desirable to provide a vehicle motion control system that is able to determine whether or not either the lateral acceleration sensor or the yaw rate sensor is experiencing an abnormality.

According to the present invention, a vehicle motion control system for a vehicle for maintaining stability of a vehicle when the vehicle is in motion includes a braking device for applying a braking force to each wheel of the vehicle. The system includes a lateral acceleration sensor for sensing a lateral acceleration of the vehicle and a yaw rate sensor for sensing a yaw rate of the vehicle. A vehicle slip angular velocity is calculated on the basis of output signals of the lateral acceleration sensor and the yaw rate sensor and then a vehicle motion condition is determined on the basis of the vehicle slip angular velocity. The braking device is actuated to apply a braking force to at least one of the wheels on the basis of the vehicle motion condition and irrespective of depression of a brake pedal in order to maintain the stability of the vehicle in motion. An abnormal condition of at least one of the lateral acceleration sensor and the yaw rate sensor is determined on the basis of the vehicle slip angular velocity.

According to another aspect of the invention, a vehicle motion control system for maintaining stability of a vehicle having a plurality of wheels when the vehicle is in motion includes a braking arrangement for applying a braking force to each wheel of the vehicle, a lateral acceleration sensor for sensing a lateral acceleration of the vehicle, a yaw rate sensor for sensing a yaw rate of the vehicle, and a slip angular velocity calculation device for calculating a vehicle slip angular velocity on the basis of output signals of the lateral acceleration sensor and the yaw rate sensor. A slip angular acceleration calculation device calculates a vehicle slip angular acceleration on the basis of the vehicle slip angular velocity calculated by the slip angular velocity calculation device and a vehicle motion determination device determines vehicle motion on the basis of the vehicle slip angular velocity calculated by the slip angular velocity calculation device. A motion control device actuates the braking arrangement to apply a braking force to at least one of the wheels on the basis of the output of the vehicle motion determination device and irrespective of depression of a brake pedal in order to maintain stability of the vehicle in motion. A sensor condition determination device determines if at least one of the lateral acceleration sensor and the yaw rate sensor is in an abnormal condition on the basis of the vehicle slip angular acceleration calculated by the slip angular acceleration calculation device.

BRIEF DESCRIPTION OF THE DRAWING FIGURES

The foregoing and additional features of the present invention will become more apparent from the following detailed description, considered with reference to the accompanying drawing figures in which like elements are designated by like reference numerals and wherein.

DETAILED DESCRIPTION OF THE PREFERRED EMBODIMENT

Figure 1:
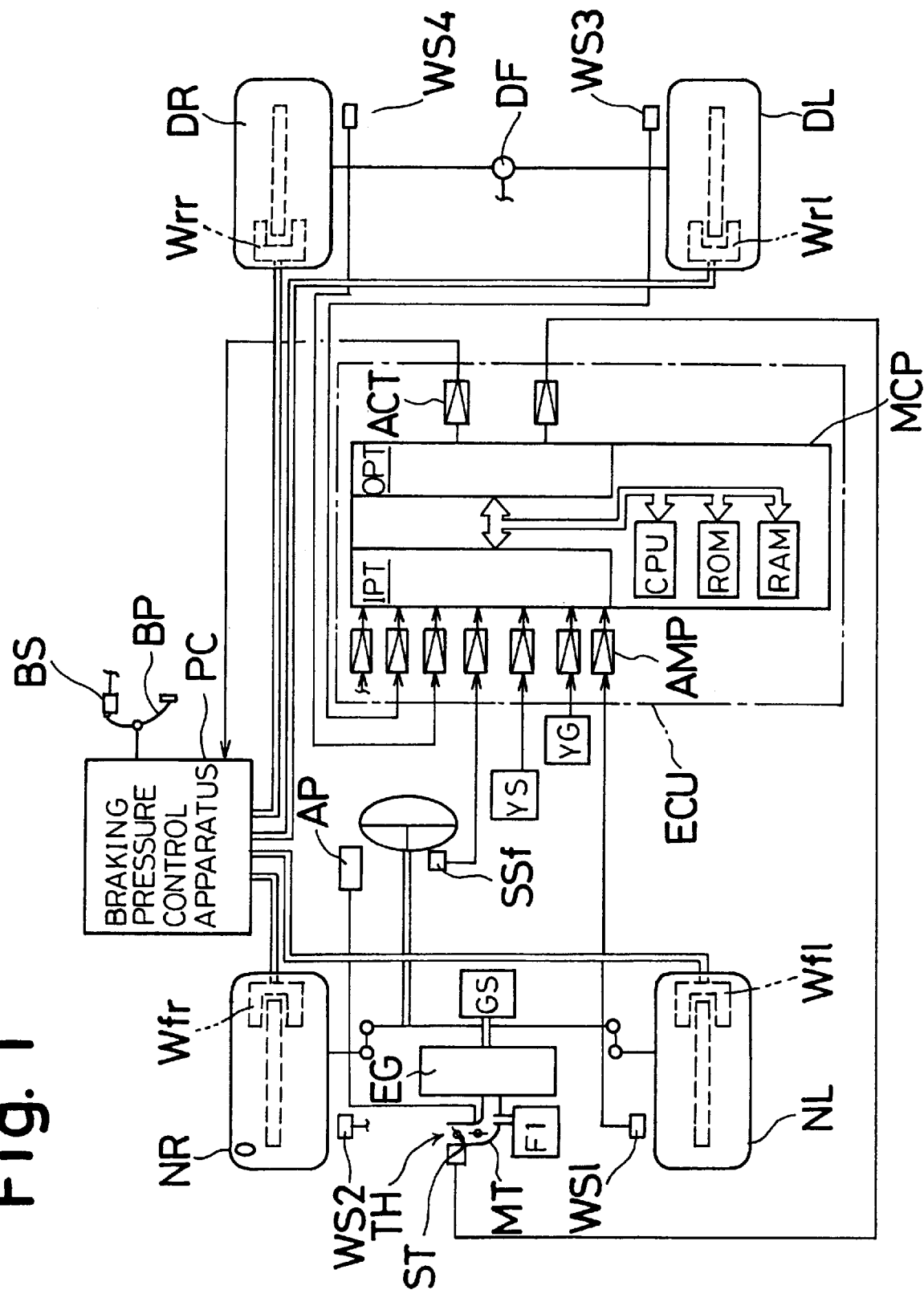
FIG. 1 is a schematic block diagram illustrating a vehicle motion control system according to the present invention.

As shown in FIG. 1, the vehicle includes an engine EG provided with a fuel injection apparatus FI and a throttle control apparatus TH which is arranged to control the main throttle opening of a main throttle valve MT in response to operation of an accelerator pedal AP. The throttle control apparatus TH has a sub-throttle valve ST which is actuated in response to an output signal of an electronic controller ECU to control a sub-throttle opening. Also, the fuel injection apparatus FI is actuated based on an output signal of the electronic controller ECU to control the fuel injected into the engine EG. According to the present embodiment, the engine EG is operatively connected with rear wheels DL, DR through a transmission GS and a differential gear DF to provide a rear-drive system. It is to be understood, however, that the present invention is not limited to a rear-drive system.

Figure 2:
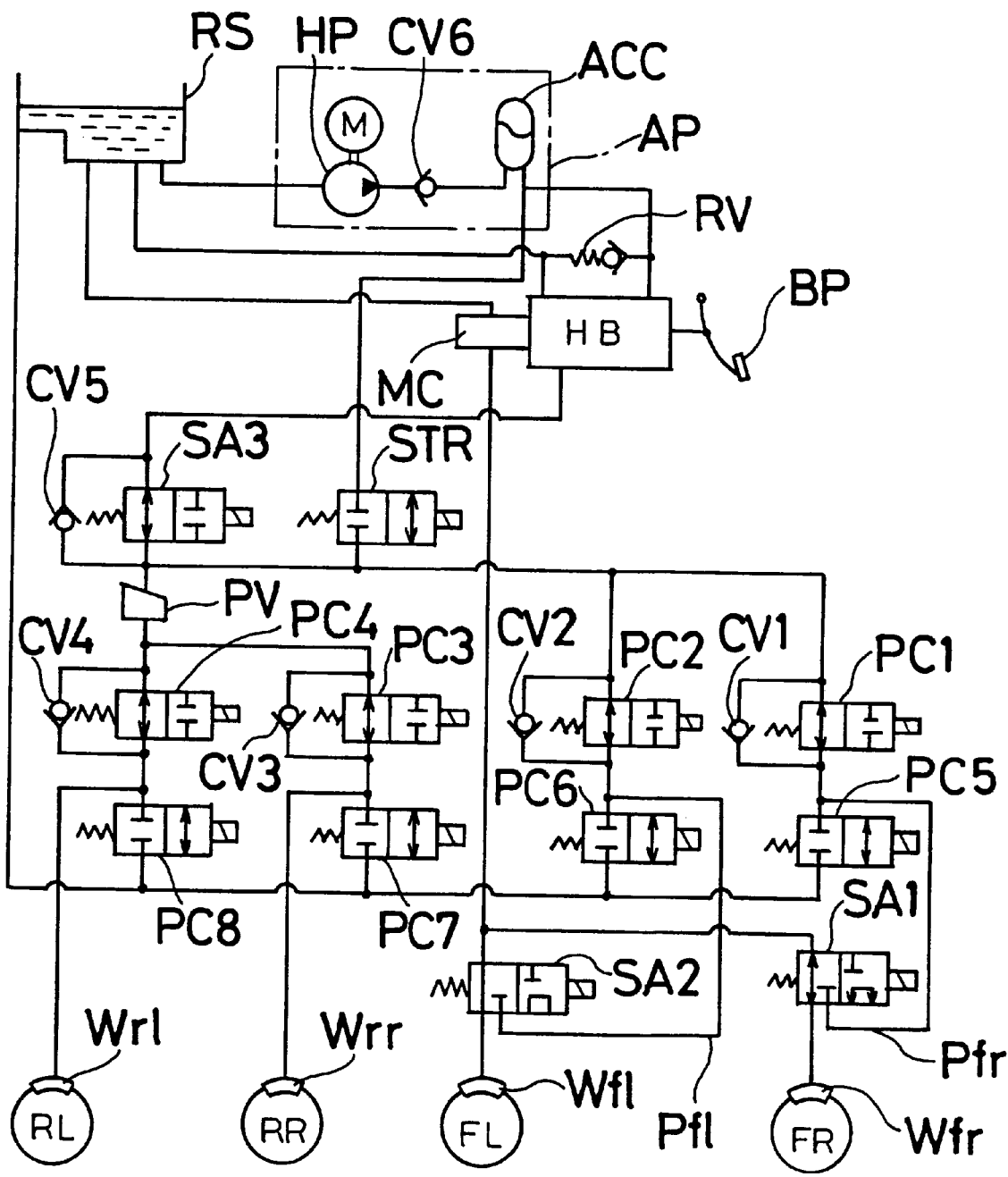
FIG. 2 is a block diagram illustrating details of the hydraulic braking pressure control apparatus shown in FIG. 1.

With respect to the braking system, wheel brake cylinders Wfl, Wfr, Wrl, Wrr are operatively mounted on the front non-driven wheels NL, NR and rear driven wheels DL, DR of the vehicle, respectively. The wheel brake cylinders Wfl, Wfr, Wrl, Wrr are fluidly connected to a hydraulic braking pressure control apparatus PC. The wheel NL designates the wheel at the front left side as viewed from the position of a driver's seat, the wheel NR designates the wheel at the front right side, the wheel DL designates the wheel at the rear left side, and the wheel DR designates the wheel at the rear right side. According to the present invention, a front-rear dual circuit system is employed, although a diagonal circuit system may also be employed. The pressure control apparatus PC is arranged to be actuated in response to operation of a brake pedal BP to control the hydraulic braking pressure supplied to each wheel brake cylinder. The pressure control apparatus PC in the present embodiment may be arranged as illustrated in FIG. 2 which will be explained in more detail below.

As shown in FIG. 1, wheel speed sensors WS1–WS4 are provided at the wheels NL, NR, DL, DR, respectively. The wheel speed sensors WS1–WS4 are connected to an electronic controller ECU and feed respective signals having pulses proportional to a rotational speed of each wheel, i.e., wheel speed signals, to the electronic controller ECU. Also electrically connected to the electronic controller ECU are a brake switch BS which turns on when the brake pedal BP is depressed and turns off when the brake pedal BP is released, a front steering angle sensor SSf for detecting a steering angle $\delta f$ of the front wheels NL, NR, a lateral acceleration sensor YG for detecting a vehicle lateral acceleration Gya, and a yaw rate sensor YS for detecting a yaw rate $\gamma$ of the vehicle.

According to the yaw rate sensor YS, a varying rate of the rotational angle of the vehicle about a normal on the center of gravity of the vehicle, i.e., a yaw angular velocity or yaw rate $\gamma$, is detected. The yaw rate $\gamma$ may be calculated on the basis of a wheel speed difference Vfd (Vfd=Vwfr−Vwfl) between the wheel speeds of the non-driven wheels (wheel speeds Vwfl, Vwfr of the front wheels NL, NR in the present invention) so that the yaw rate sensor YS may be omitted. Furthermore, a steering angle control apparatus (not shown) may be provided between the wheels DL and DR to enable a motor (not shown) to control the steering angle of the wheels DL, DR in response to the output of the electronic controller ECU.

As shown in FIG. 1, the electronic controller ECU is provided with a microcomputer MCP which includes a central processing unit or CPU, a read-only memory or ROM, a random access memory or RAM, an input port IPT, and an output port OPT, etc. The signals detected by each of the wheel speed sensors WS1, WS2, WS3, WS4, the brake switch BS, the front steering angle sensor SSf, the yaw rate sensor YS and the lateral acceleration sensor YG are fed to the input port IPT via respective amplification circuits AMP and then to the CPU. Then, control signals are fed from the output port OPT to the throttle control apparatus TH and hydraulic pressure control apparatus PC via the respective driving circuits ACT. In the microcomputer MCP, the ROM memorizes a program corresponding to the flowcharts shown in FIG. 3–8, the CPU executes the program while an ignition switch (not shown) is closed, and the RAM temporarily memorizes variable data needed to execute the program. A plurality of microcomputers may be provided for each wheel such as throttle control, or may be provided for performing various controls, and electrically connected to each other.

As shown in FIG. 2, the hydraulic braking pressure control apparatus PC includes a master cylinder MC and a hydraulic booster HB which are activated in response to depression of the brake pedal BP. The hydraulic booster HB is connected to an auxiliary pressure source AP, both of which are connected to a low pressure reservoir RS. The master cylinder MC is also connected to the low pressure reservoir RS. The auxiliary pressure source AP includes a hydraulic pressure pump HP and an accumulator Acc. The pump HP is driven by an electric motor M to pressurize brake fluid in the reservoir RS and discharge the pressurized brake fluid or hydraulic braking pressure through a check valve CV6 into the accumulator Acc to accumulate it therein. The electric motor M starts to operate when the pressure in the accumulator Acc is decreased to a level less than a predetermined lower limit, and stops when the pressure in the accumulator Acc is increased to exceed a predetermined upper limit. A relief valve RV is provided between the accumulator Acc and the reservoir RS. Accordingly, a so-called power pressure is properly supplied from the accumulator Acc to the hydraulic booster HB. The hydraulic booster HB introduces the hydraulic braking pressure discharged from the auxiliary pressure source AP and regulates it to a booster pressure in proportion to a pilot pressure discharged from the master cylinder MC, which is boosted by the boost pressure.

In a hydraulic pressure circuit for connecting the master cylinder MC with each of the front wheel brake cylinders Wfr, Wfl, solenoid valves SA1, SA2 are dispersed and are connected to solenoid valves PC1, PC5 and solenoid valves PC2, PC6, through control passages Pfr, Pfl, respectively. In the hydraulic pressure circuit for connecting the hydraulic booster HB with each of the wheel brake cylinders Wrr, a solenoid valve SA3, and solenoid valves PC1–PC8 are disposed, and a proportioning pressure decreasing valve PV is disposed at the side of the rear wheels. Then, the auxiliary pressure source AP is connected to the downstream side of the solenoid valve SA3 through a solenoid valve STR. The hydraulic circuits are divided into the front circuit system and the rear circuit system as shown in FIG. 2 to form the front and rear dual circuit system according to the present invention.

With respect to the front hydraulic pressure circuit, the solenoid valves PC1 and PC2 are connected to the solenoid valve STR, which is a two-port two-position solenoid operated normally closed valve that is activated to communicate the solenoid valves PC1, PC2 directly with the accumulator Acc. The solenoid valves SA1, SA2 are three-port two-position solenoid operated valves which are placed in a first operating position as shown in FIG. 2, when they are not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6. Check valve CV1, CV2 are disposed in parallel with the solenoid valves PC1 and PC2, respectively. The inlet side of the check valve CV1 is connected to the passage Pfr, and the inlet side of the check valve CV2 is connected to the passage Pfl. The check valves CV1 and CV2 are provided for allowing the flow of brake fluid toward the hydraulic booster HB and preventing reverse flow. In the case where the solenoid valve SA1 is energized to be placed in the second position, if the brake pedal BP is released, the hydraulic pressure in the wheel brake cylinder Wfr is rapidly reduced to the pressure discharged from the hydraulic booster HB.

With respect to the rear hydraulic pressure circuit, the solenoid valve SA3 is a two-port two-position solenoid operated valve, which is normally opened as shown in FIG. 2, so that the solenoid valves PC3 and PC4 are communicated with the hydraulic booster HB through the proportioning valve PV. In this case, the solenoid valve STR is placed in its closed position to shut off communication with the accumulator Acc. When the solenoid valve SA3 is energized, it is placed in its closed position, where both of the solenoid valves PC3 and PC4 are prevented from communicating with the hydraulic booster HB, while being in communication with the solenoid valve STR through the proportioning valve PV, so that they are communicated with the accumulator Acc when the solenoid valve STR is energized. Check valves CV3 and CV4 are disposed in parallel with the solenoid valves PC3 and PC4, respectively. The inlet side of the check valve CV3 is connected to the wheel brake cylinder Wrr, and the inlet side of the check valve CV4 is connected to the wheel brake cylinder Wrl. The check valves CV3 and CV4 are provided for allowing the flow of the brake fluid toward the solenoid valve SA3 and preventing reverse flow. If the brake pedal BP is released, the hydraulic pressure in each of the wheel brake cylinders Wrr, Wrl is rapidly reduced to the pressure discharged from the hydraulic booster HB. Furthermore, a check valve CV5 is disposed in parallel with the solenoid valve SA3, so that brake fluid can be supplied from the hydraulic booster HB to the wheel brake cylinders Wrr, Wrl in response to depression of the brake pedal BP.

The above-described solenoid valves SA1, SA2, SA3 and STR and solenoid valves PC1–PC8 are controlled by the electronic controller ECU to provide various control modes for controlling the stability of the vehicle, such as steering control through braking, anti-skid control, and various other control modes. For example, when the steering control through braking is performed, which is to be executed irrespective of depression of the brake pedal BP, the hydraulic pressure is not discharged from the hydraulic booster HB and the master cylinder MC. Therefore, the solenoid valves SA1 and SA2 are placed in their second positions, the solenoid valve SA3 is placed in its closed position, and then the solenoid valve STR is placed in its open position, so that the power pressure can be discharged to the wheel brake cylinders Wfr, Wfl, Wrr, Wrl through the solenoid valve STR and any of the solenoid valves PC1–PC8. Consequently, with the solenoid valves PC1–PC8 energized or de-energized, the hydraulic pressure in each wheel brake cylinder is rapidly increased in the rapid pressure increasing zone, gradually increased in the pulse pressure increasing zone, gradually decreased in the pulse pressure decreasing zone, rapidly decreased in the rapid pressure decreasing zone, and held in the pressure holding zone so that the oversteer restraining control and/or the understeer restraining control can be performed.

Figure 3:
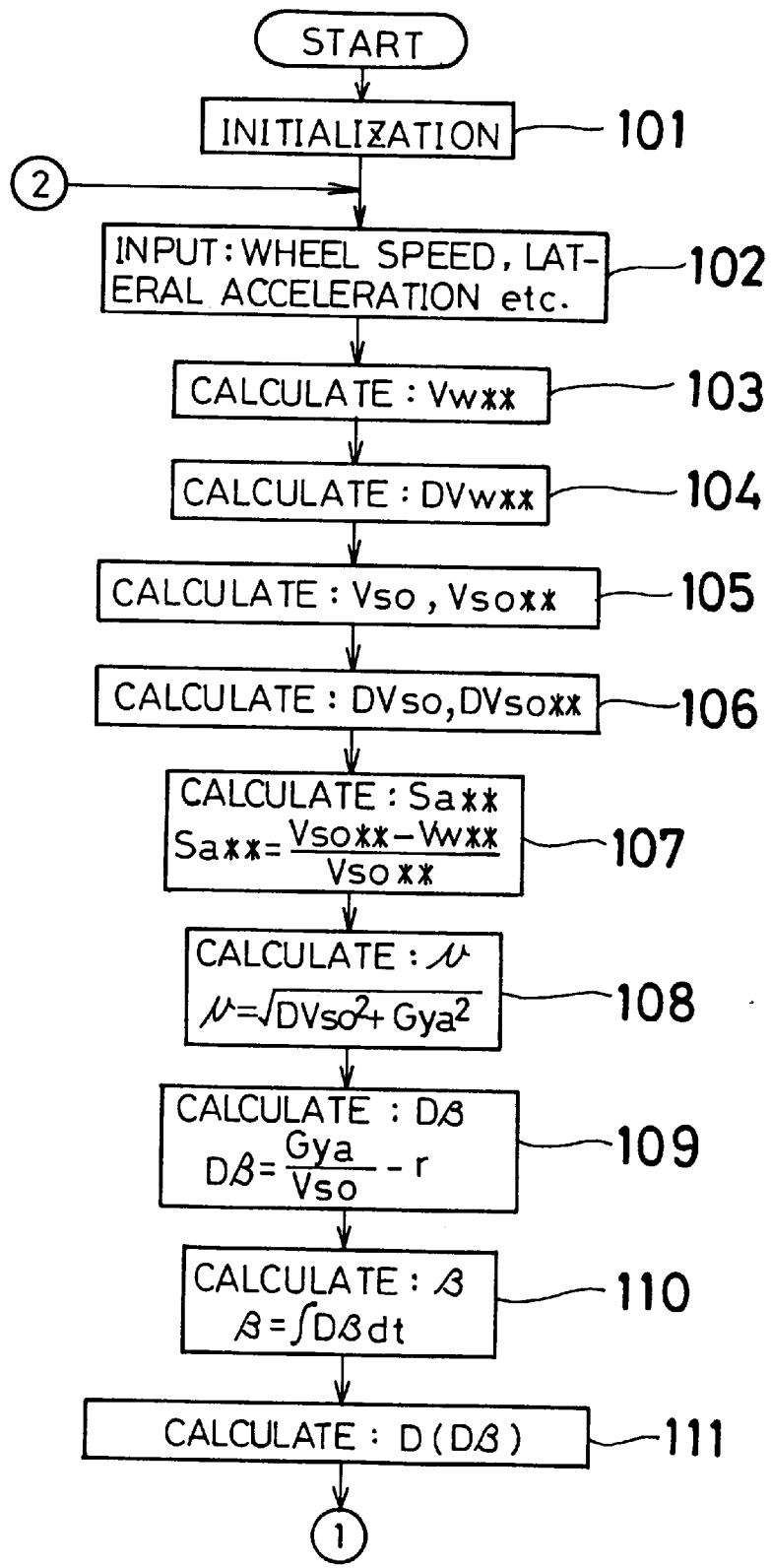
FIG. 3 is a flowchart showing a portion of the main routine for vehicle motion control carried out by the electronic controller shown in FIG. 1.

According to the present invention as constituted above, a program routine for vehicle motion control including the steering control through braking operation, anti-skid control and so on is executed by the electronic controller ECU, as will be described hereinafter with reference to FIGS. 3 to 8. The program routine starts when the ignition switch is turned on. At the outset, the program for vehicle motion control as shown in FIG. 3 provides for initialization of the system at Step 101 to clear various data. At Step 102, the signals detected by the wheel speed sensors WS1 to WS4 are read by the electronic controller ECU. The ECU also reads the signal (steering angle δf) detected by the front angle sensor ssf, the signal (actual yaw rate γ) detected by the yaw rate sensor YS, and the signal (actual lateral acceleration Gya) detected by the lateral acceleration sensor YG.

Then, the program proceeds to Step 103 where the wheel speed $Vw^{}$ of each wheel is calculated. At Step 104, a wheel acceleration $DVw^{}$ of each wheel is calculated on the basis of the wheel speed $Vw^{}$. Next, the program proceeds to Step 105 where an estimated vehicle speed Vso (=MAX[$Vw^{}$]) in the position of the center of gravity of the vehicle, and an estimated vehicle speed $Vso^{}$ in the position of each wheel are calculated, respectively, on the basis of the wheel speed $Vw^{}$. The estimated vehicle speed $Vso^{}$ may be normalized to reduce the error caused by a difference between the wheels located on the inside and outside of the curve while cornering. That is, the normalized vehicle speed $NVso^{}$ is calculated in accordance with the following equation:

$$NVso^{} = Vso^{}(n) - \Delta Vr^{**}(n)$$

where $\Delta Vr^{}(n)$ is a correction factor provided for correction during cornering, as follows. The correction factor $\Delta Vr^{}(n)$ is set on the basis of a turning radius R and γ·VsoFW (FW represents the front wheels) which is nearly equal to the lateral acceleration Gya, according to a map (not shown) provided for each wheel except for a reference wheel. If Δ VrNL is employed as a reference value for example, it is set to be zero. Then, Δ VrNR is set according to a map provided for the difference between two wheels located on the inside and outside of the curve during cornering. With respect to the rear wheels, Δ VrDL is set according to a map provided for the difference between two wheels both located on the inside of the curve during cornering, while Δ VrDR is set according to a map provided for the difference between two wheels located on the inside and outside of the curve during cornering.

At step 106, a vehicle acceleration DVso in the position of the center of gravity of the vehicle and a vehicle acceleration $DVso^{}$ in the position of each wheel are calculated on the basis of the vehicle speeds Voo, $Vso^{}$, respectively. Next, the program proceeds to Step 107 where an actual slip rate $Sa^{}$ is calculated for each wheel on the basis of the wheel speed $Vw^{}$ and the vehicle speed $Vso^{}$ in the position of each wheel (or the normalized vehicle speed $NVso^{}$), in accordance with the following equation:

$$Sa^{}=(Vso^{}-Vw^{})/Vso^{}$$

Furthermore, at Step 108, a coefficient of friction $\mu$ against a road surface is calculated on the basis of the vehicle acceleration DVso and the actual vehicle lateral acceleration Gya, in accordance with the following equation:

$$\mu=(Dvso^2+Gya^2)^{1/2}$$

A coefficient of friction $\mu$ in the position of each wheel may be calculated as:

$$\mu^{}=(DVso^{2}+Gya^2)^{1/2}.$$

Then, the program proceeds to Step 109 where a vehicle slip angular velocity D $\beta$ is calculated on the basis of the yaw rate $\gamma$, the actual lateral acceleration Gya and the vehicle speed Vso, in accordance with the following equation:

$$D\beta=Gya/Vso-\gamma$$

Next, at Step 110, a vehicle slip angle $\beta$ is calculated on the basis of the vehicle slip angular velocity in accordance with the following equation:

$$\beta=\int D\beta dt$$

The vehicle slip angle $\beta$ is an angle which corresponds to vehicle slip against the vehicle path of motion. The vehicle slip angle $\beta$ may be calculated on the basis of a longitudinal vehicle speed Vx and a lateral vehicle speed Vy in accordance with the following equation:

$$\beta=\tan^{-1}(Vy/Vx)$$

Next, at Step 111, the vehicle slip angular acceleration D(D$\beta$) is calculated on the basis of the vehicle slip angular velocity D$\beta$.

Figure 4:
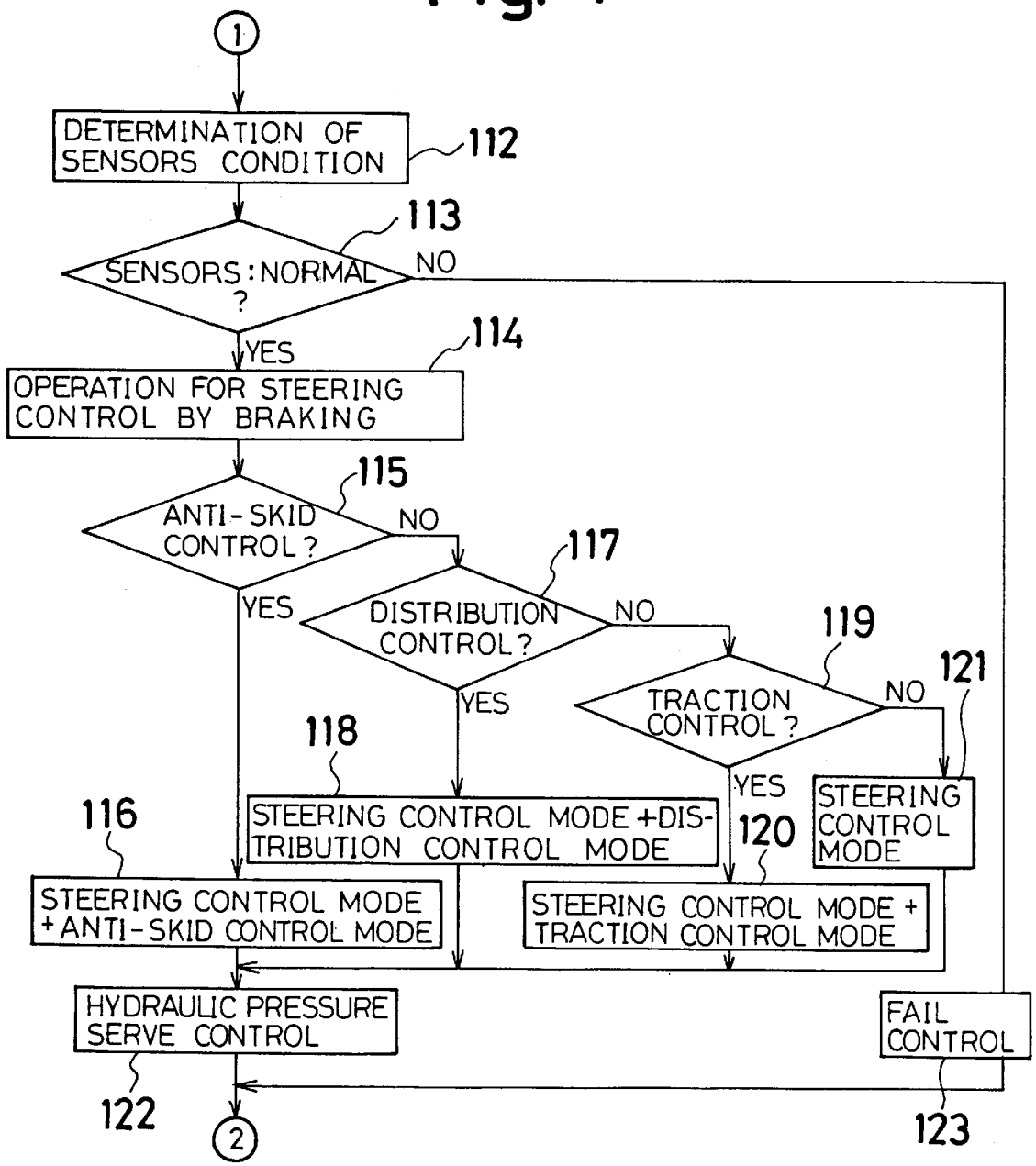
FIG. 4 is a flowchart showing another portion of the routine for vehicle motion control carried out by the electronic controller shown in FIG. 1.

Then, the program proceeds to Step 112 in FIG. 4 where the condition of the sensors is determined and the program proceeds to Step 113. Here, it is determined whether or not the signal detected by the yaw rate sensor YS and the signal detected by the lateral acceleration sensor YG are under an abnormal condition, as explained later on. If it is determined that the sensor is under a normal condition at Step 112, the program proceeds to Step 114 where an operation for the steering control through braking is performed to provide a desired slip rate for use in the steering control by braking and then the program proceeds to Step 115. On the other hand, if it is determined at Step 112 that the sensor is under an abnormal condition, the program proceeds to Step 123 where a fail-control for an abnormal condition of the sensors is executed as explained later on.

At stop 115, it is determined whether or not the condition for initiating anti-skid control is fulfilled. If so, the program proceeds to Step 116 where a control mode is set to both the steering control mode and the anti-skid control mode and then the program proceeds to Step 122. If it is determined that the condition for initiating anti-skid control is not fulfilled at Step 115, the program proceeds to Step 117 where it is determined whether or not the condition for initiating the front and rear braking force distribution control is fulfilled.

If so, the program proceeds to Step 118 where the control mode is set to both the steering control mode and the braking force distribution control mode and then the program proceeds to Step 122. If it is determined that the condition for initiating the braking force distribution control is not fulfilled at Step 117, the program proceeds to Step 119 where it is determined whether or not the condition for initiating the traction control is fulfilled. If so, the program proceeds to Step 120 where the control mode is met to both the steering control mode and the traction control mode and then the program proceeds to Step 122. If it is determined that the condition for initiating the traction control in not fulfilled at Step 119, the program proceeds to Step 121 where the control mode is set to only the steering control mode and then the program proceeds to Step 122.

At Step 122, a hydraulic pressure servo control is performed on the basis of the control modes set at Steps 116, 118, 120, 121. That is, the pressure control apparatus PC is controlled in the condition of the vehicle in motion. Then, the program returns to Step 102 in FIG. 3. In accordance with the control modes set at Steps 116, 118, 120, 121, the sub-throttle control apparatus TS may be adjusted in response to the condition of the vehicle in motion, so that the output of the engine EG could be reduced to limit the driving force produced by the engine.

According to the above-described anti-skid control mode, the braking force applied to each wheel is controlled so as to prevent the wheel from being locked during the vehicle braking operation. In the front-rear braking force distribution control mode, a distribution between the braking force applied to the rear wheels and the braking force applied to the front wheels is controlled so as to maintain vehicle stability during the vehicle braking operation. Further, in the traction control mode, the braking force is applied to the driven wheel, and throttle control is performed so as to prevent the driven wheel from slipping during the vehicle driving operation.

Figure 5:
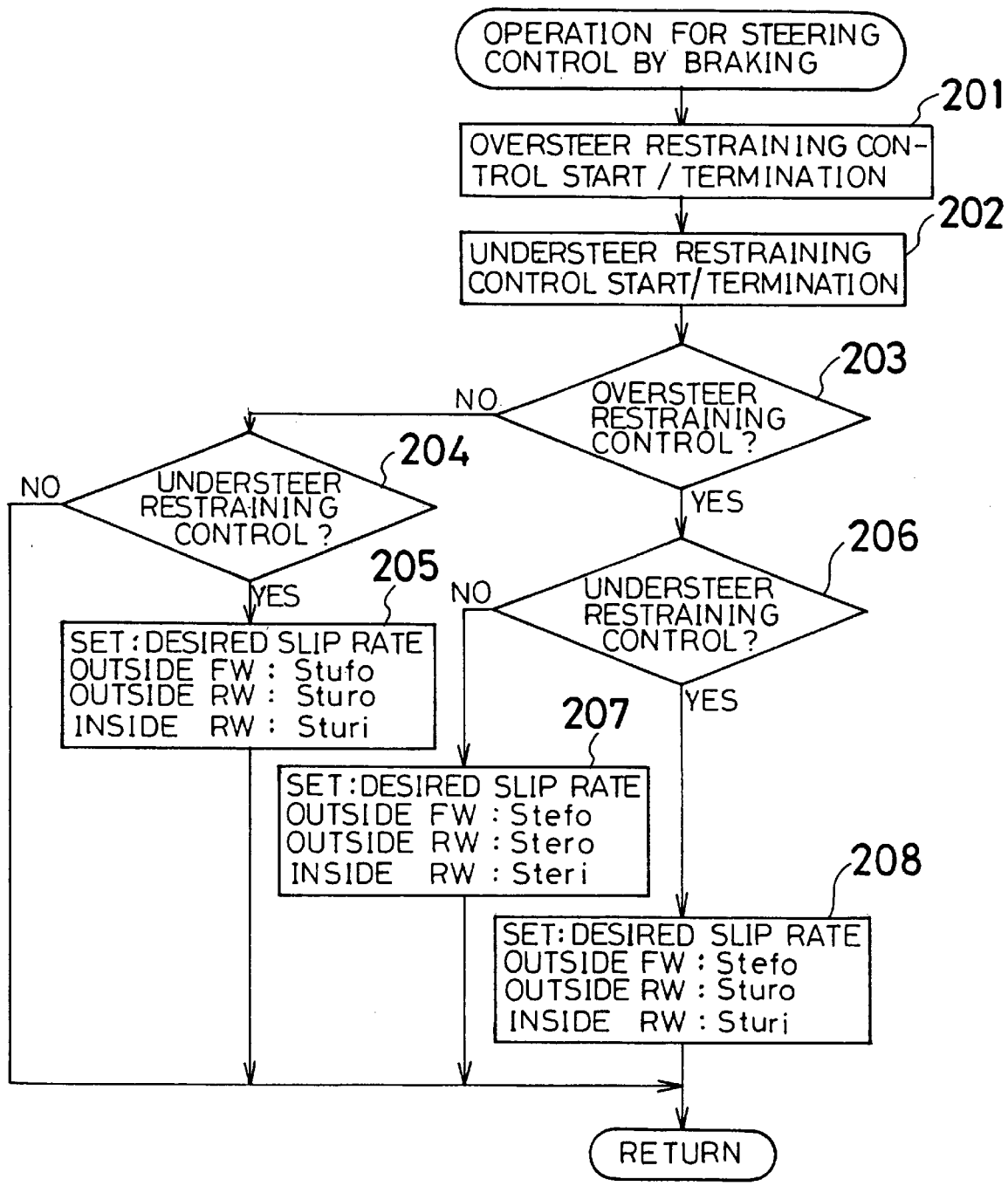
FIG. 5 is a flowchart showing a subroutine for the braking operation steering control shown in FIG. 4.

The operation for steering control by braking carried out in Step 114 in FIG. 4 is explained in detail with reference to the flowchart shown in FIG. 5. The steering control by braking includes an oversteer restraining control and an understeer restraining control. In FIG. 5, the desired slip rates for selected wheels are set in accordance with the oversteer restraining control and the understeer restraining control.

Figure 9:
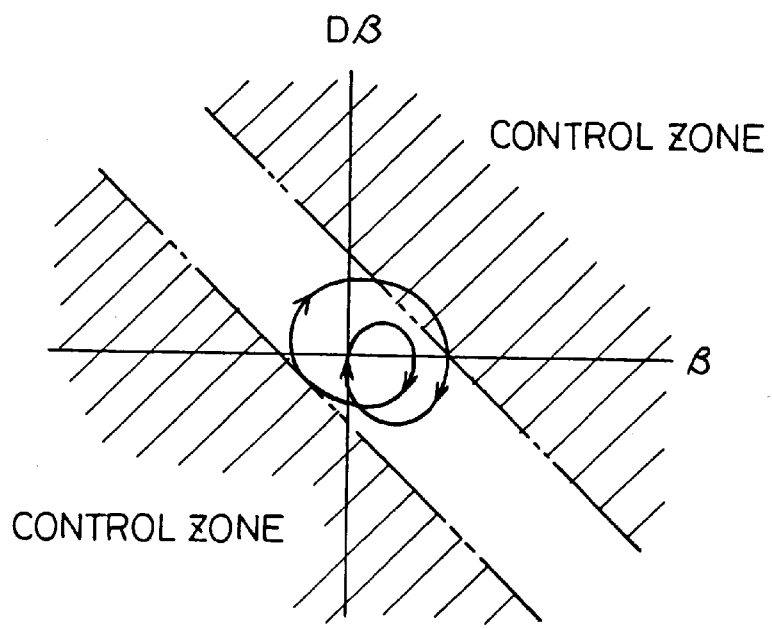
FIG. 9 is a diagram showing a region for determining the start and termination of the oversteer restraining control.

At first, it is determined at Step 201 whether the overseer restraining control is to be started or terminated. At Step 202 it is determined whether the understeer restraining control is to be started or terminated. More specifically, the determination at Step 201 is made based on the determination whether certain values are within a control zone indicated by hatching on a $\beta$-D $\beta$ plane as shown in FIG. 9. That is, if the vehicle slip angle $\beta$ and the vehicle slip angular velocity D $\beta$ fall within the control zone, the oversteer restraining control will be started. However, if the vehicle slip angle $\beta$ and the vehicle slip angular velocity D $\beta$ are out of the control zone, the oversteer restraining control will be terminated. Further, the braking force applied to each wheel is controlled in such a manner that the more remote the values are from the boundary between the control zone and the non-control zone (as indicated by the two dotted chain line in FIG. 9) toward the control zone, the more the amount to be controlled will be provided.

Figure 10:
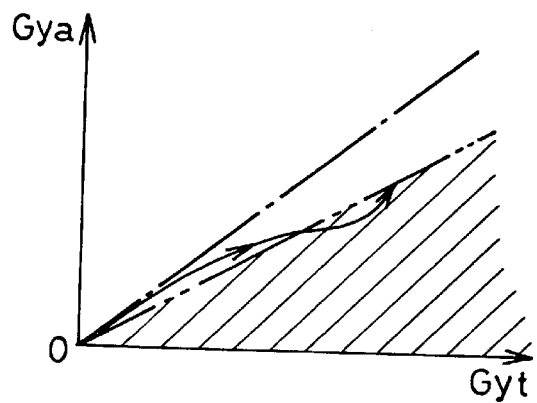
FIG. 10 is a diagram showing a region for determining the start and termination of the understeer restraining control.

The determination of the start and termination in Step 202 is made on the basis of whether certain values are within a control zone indicated by hatching in FIG. 10. That is, in accordance with the variation of the actual lateral acceleration Gya with respect to a desired lateral acceleration Gyt, if it moves out of the desired condition as indicated by the one dotted chain line, and fall within the control zone, the understeer restraining control will be started. If this moves out of the control zone, the oversteer restraining control will be terminated.

The program then proceeds to Step 203 where it is determined whether or not the oversteer restraining control is to be performed. If the oversteer restraining control is not to be performed, the program further proceeds to Step 204 where it is determined whether or not the understeer restraining control is to be performed. In the case where the understeer restraining control is not to be performed, the program returns to the main routine. In the case where it is determined at Step 204 that the understeer restraining control is to be performed, the program proceeds to Step 205 where the front wheel on the outside of the curve (hereinafter referred to as the outside front wheel), the rear wheels on the inside and outside of the curve (hereinafter referred to as the inside and outside rear wheels) are selected as the wheels to be controlled, and the desired slip rates Stufo, Sturo, Sturi of the selected wheels which are used in understeer restraining control are set on the basis of the difference $\Delta Gy$ between the desired lateral acceleration Gyt and the actual acceleration Gya, in accordance with the following equations:

$$Stufo = K1 \cdot \Delta Gy$$

$$Sturo = K2 \cdot \Delta Gy$$

$$Sturi = K3 \cdot \Delta Gy$$

where K1 is a constant for providing the desired yaw rate Stufo which is used for increasing the braking pressure (or, alternatively decreasing the braking pressure), while K2 and K3 are constants for providing the desired yaw rates Sturo, Sturi both of which are used for increasing the braking pressure. At Step 205, "t" indicates a desired value, which is comparable with a measured value indicated by "a" as described later "u" indicates the understeer restraining control, "r" indicates the rear wheel, "o" indicates the outside of the curve, and "i" indicates the inside of the curve. The desired lateral acceleration Gyt is calculated in accordance with the following equations:

$$Gyt = \gamma \cdot (\delta f) Vso;$$

$$\gamma \cdot (\delta f) = (\delta f / N \cdot L) \cdot Vso / (1 + Kh \cdot Vso^2)$$

where "Kh" is a stability factor, "N" is a steering gear ratio, and "L" is the wheel base of the vehicle.

If it is determined at Step 203 that the oversteer restraining control is to be performed, the program proceeds to Step 206 where it is determined whether or not the understeer restraining control is to be performed or not. In the case where it is determined that the understeer restraining control is not to be performed, the program proceeds to Step 207 where the outside front wheel, the inside and outside rear wheels are selected as the wheels to be controlled, and the desired slip rates Stefo,Stero,Steri of the selected wheels which are used in oversteer restraining control are set on the basis of the vehicle slip angle $\beta$ and the vehicle slip angular velocity $D \beta$, in accordance with the following equations:

$$Stefo = K4 \cdot \beta + K5 \cdot D \beta$$

$$Stero = K6 \cdot \beta + K7 \cdot D \beta$$

$$Steri = K8 \cdot \beta + K9 \cdot D \beta$$

where K4 to K9 are constants which are set so as to provide the desired slip rates Stefo, Stero which are used for increasing the braking pressure, and the desired slip rate Steri which in used for decreasing the braking pressure. At Step 207, "a" indicates the oversteer restraining control.

In the situation where it is determined at Step 206 that the understeer restraining control is to be performed, the program proceeds to Step 208 where the outside front wheel, and the inside and outside rear wheels are selected as the wheels to be controlled, and the desired slip rates of the selected wheels which are used in both the oversteer restraining control and the are understeer restraining control are set as follows. The desired slip rate of the outside front wheel is set to Stefo which is the same rate as the desired slip rate for use in the oversteer restraining control, while the desired slip rates of the rear wheels are set to Sturo, Sturi which are the same rates as the desired slip rates for use in the understeer restraining control. In all cases, however, the front wheel on the inside of the curve is not controlled.

Figure 6:
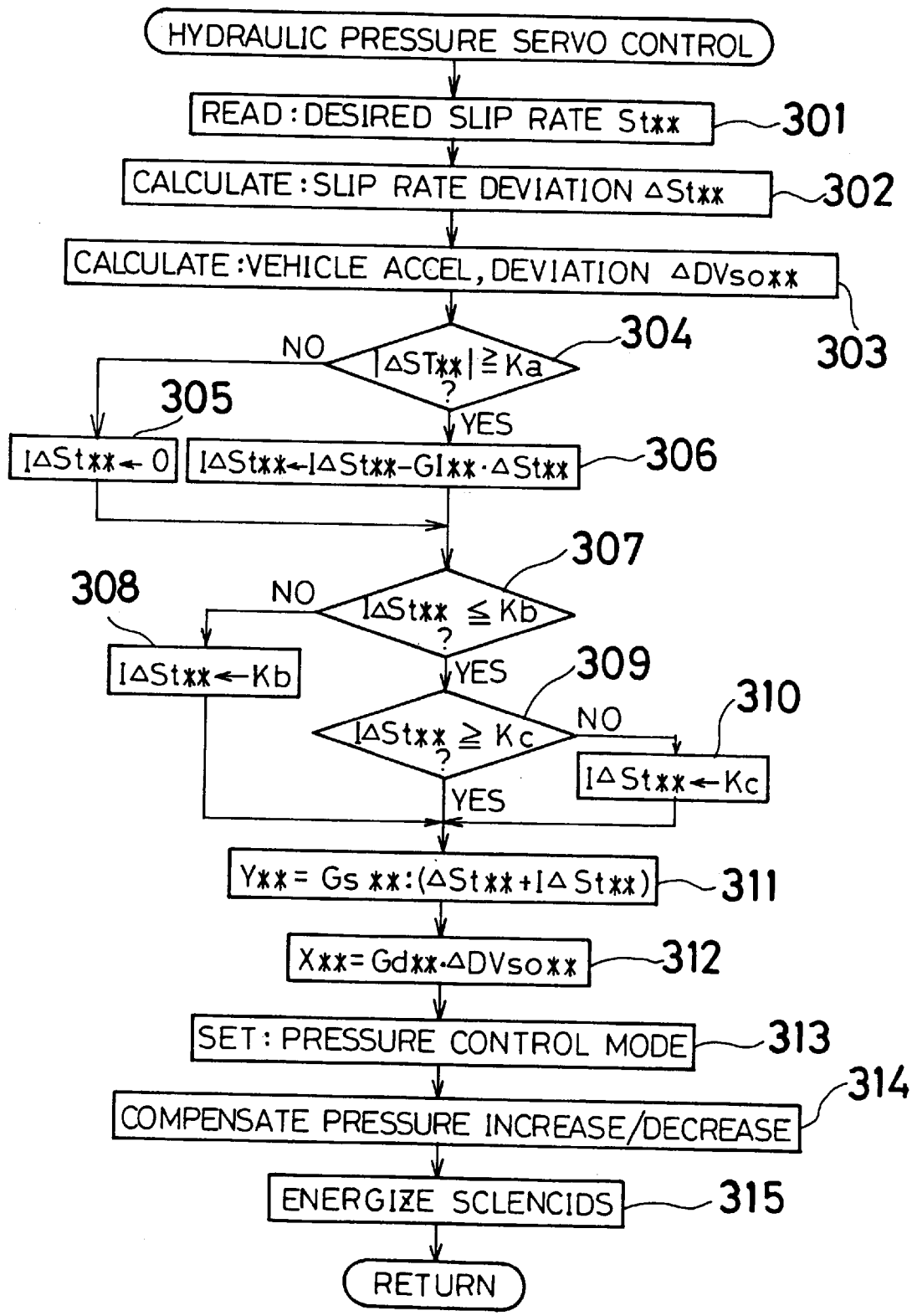
FIG. 6 is a flowchart showing a subroutine for the hydraulic pressure servo control shown in FIG. 4.

The hydraulic pressure servo control carried out in Step 122 in FIG. 4 is explained in detail with reference to FIG. 6.

At Step 301, the desired slip rates $St^{}$, which are set at Step 205,207 or 208, are read. Various correction values are added to the desired slip rate $St^{}$ for each control mode. For example, a correction value $\Delta Ss^{}$ is added to the desired slip rate $St^{}$ for the anti-skid control to renew the desired slip rate $St^{}$. A correction valued $Sb^{}$ is added to the desired slip rate $St^{}$ for the braking force distribution control to renew the desired slip rate $St^{}$. A correction value $\Delta Sr^{}$ is added to the desired slip rate $St^{}$ for the traction control to renew the desired slip rate $St^{}$. Then, the program proceeds to Step 302 where a slip rate deviation $\Delta Sd^{}$ between the actual slip rate $Sa^{}$ and the desired slip rate $St^{}$ of each selected wheel is calculated as $\Delta Sd^{} = St^{} - Sa^{**}$.

Next, at Step 303, a vehicle acceleration deviation $\Delta DVso^{}$ between the vehicle acceleration DVso and the wheel acceleration $DVw^{}$ of each selected wheel is calculated as $\Delta DVso^{} = DVso - DVw^{}$. The actual slip rate $Sa^{}$ and the vehicle acceleration deviation $\Delta DVso^{}$ may be calculated in accordance with a specific manner which is determined in dependence upon the control modes such as the anti-skid control mode, traction control mode, or the like.

Then, the program proceeds to Step 304 where the slip rate deviation $\Delta Sd^{}$ is compared with a predetermined value Ka. If an absolute value of the slip rate deviation $|\Delta Sd^{}|$ is equal to or greater than the predetermined value Ka, the program proceeds to Step 306 where an integrated value ($I \Delta Sd^{}$) of the slip rate deviation $\Delta Sd^{}$ is renewed. That is, the value of the slip rate deviation $\Delta Sd^{}$ multiplied by a gain $GI^{}$ is added to the integrated value of the slip rate deviation $I \Delta Sd^{}$ obtained at the previous cycle of this routine to provide the integrated value of the slip rate deviation $I \Delta Sd^{}$ at the present cycle. If the absolute value of the slip rate deviation $|\Delta Sd^{}|$ is smaller than the predetermined value Ka, the program proceeds to Step 305 where the integrated value of the slip rate deviation $I \Delta Sd^{}$ is cleared to be zero (0). Then, the program proceeds to Steps 307 to 310 where the integrated value of the slip rate deviation $I \Delta Sd^{}$ is limited to a value which is equal to or smaller than an upper limit value Kb or which is equal to or greater than a lower limit value Kc. If the integrated value of the slip rate deviation $I \Delta Sd^{}$ is greater than the upper limit value Kb, it is set to the value Kb at Step 308, whereas if the integrated value of the slip rate deviation $I \Delta Sd^{**}$ is smaller than the lower limit value Kc, it is set to the value Kc at Step 310.

Figure 11:
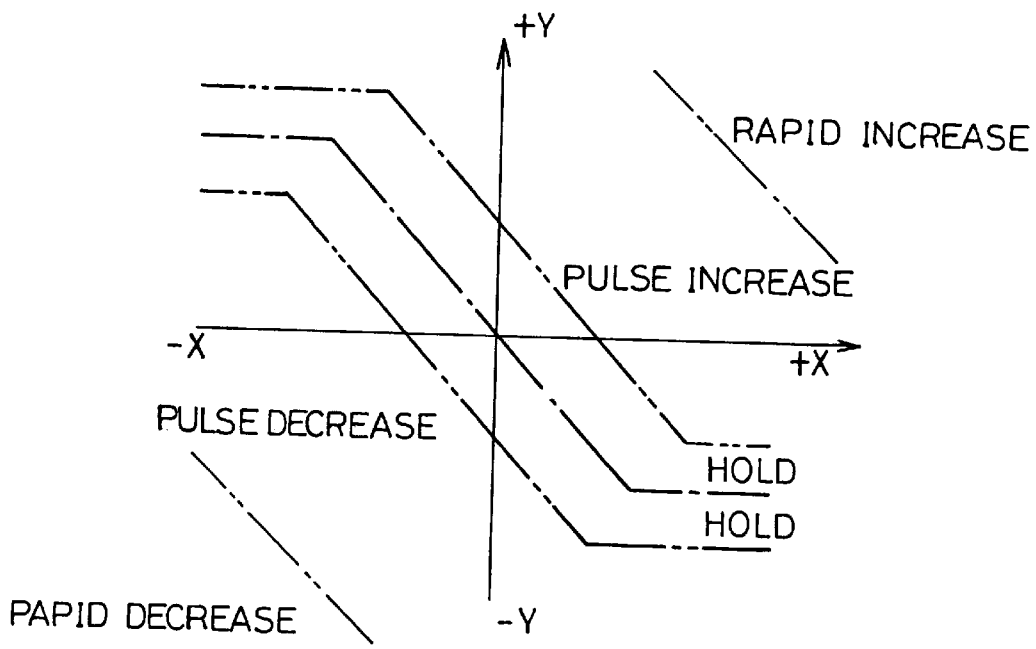
FIG. 11 is a diagram showing the relationship between pressure control modes and parameters for use in the hydraulic pressure control.
Figure 12:
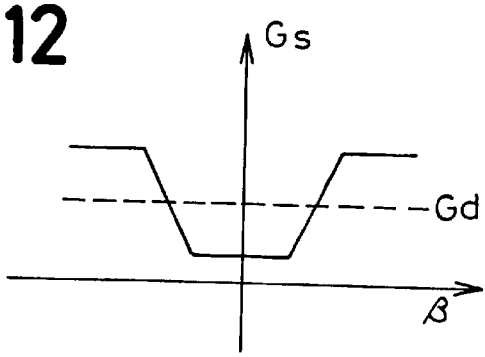
FIG. 12 is a diagram showing the relationship between a vehicle slip angle and a gain for calculating the parameters.

Thereafter, the program proceeds to Step 311 where a parameter $Y^{**}$ for providing the hydraulic pressure control in each control mode is calculated in accordance with the following equation:

$$Y^{} = Gs^{} \cdot (\Delta Sd^{} + I \Delta Sd^{})$$

where "$Gs^{}$" is a gain, which is provided in response to the vehicle slip angle $\beta$ and in accordance with a diagram as shown by a solid line in FIG. 12. The program further proceeds to Step 312 where another parameter X is calculated in accordance with the following equation:

$$X^{} = Gd^{} \cdot \Delta DV_{SO}^{**}$$

where "Gd" is a gain which is a constant value as shown by a broken line in FIG. 12. On the basis of the parameters X and Y, a pressure control mode for each selected wheel is provided at Step 313, in accordance with a control map as shown in FIG. 11. The control map has a rapid pressure increasing zone, a pulse pressure increasing zone, a pulse pressure decreasing zone, and a rapid pressure decreasing zone which are provided in advance as shown in FIG. 11, so that one of the zones is selected in accordance with the parameters X and Y**. In the case where no control mode is performed, no pressure control mode is provided (i.e. the solenoids are off).

At Step 314, a pressure increase and decrease compensating control is performed, which is required for smoothing the first transition and the last transition of the hydraulic pressure, when the presently selected zone is changed from the previously selected zone, e.g., from the pressure increasing zone to the pressure decreasing zone, or vice versa. When the zone is changed from the rapid pressure decreasing zone to the pulse pressure increasing zone, for instance, a rapid pressure increasing control is performed for a period which is determined on the basis of a period during a previous rapid pressure decreasing mode. Next, the program proceeds to Step 315 where each solenoid valve in the hydraulic pressure control apparatus PC is energized or de-energized in accordance with the mode determined by the selected pressure control zone, so that the braking force applied to the selected wheels can be controlled.

Figure 7:
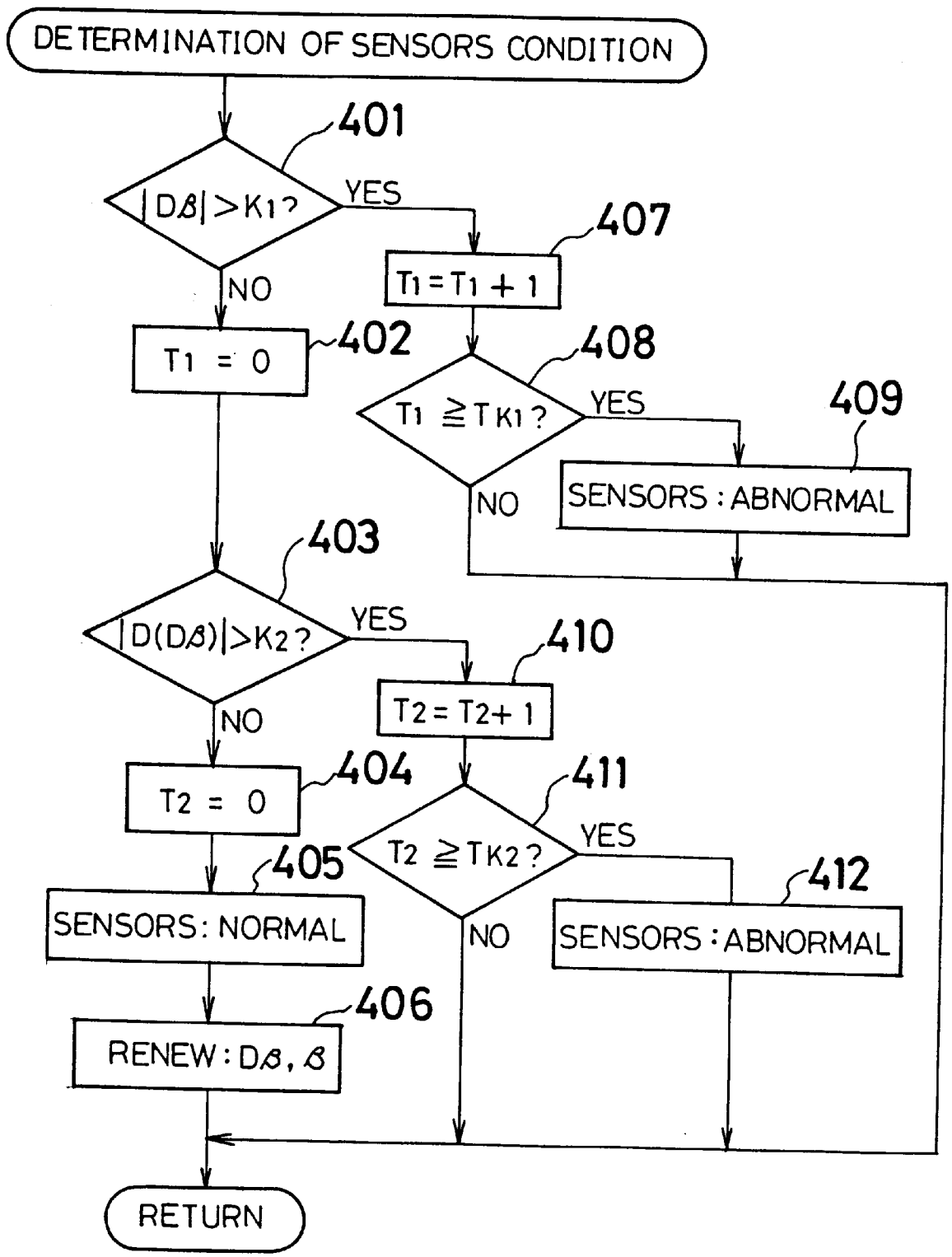
FIG. 7 is a flowchart showing a subroutine for the sensor condition determination shown in FIG. 4.

The determination of the condition of the sensors which is carried out in Step 112 in FIG. 4 is explained with reference to FIG. 7.

At first, in step 401, an absolute value of the vehicle slip angular velocity |D β| is compared with a predetermined upper limit value K1. The predetermined upper limit value K1 is set to a vehicle slip angular velocity which is equal to or greater than a maximum value of the vehicle angular velocity during the oversteer restraining control when both the yaw rate sensor YS and the lateral acceleration sensor YG are in the normal condition. If it is determined at Step 401 that the absolute value of the vehicle slip angular velocity |D β| is lower than the predetermined upper limit value K1, the program proceeds to Step 402 where a first timer T1 is cleared to zero (0).

Then, at step 403, an absolute value of the vehicle slip angular acceleration |D(D β)| is compared with a predetermined upper limit value K2. The predetermined upper limit value K2 is set to a vehicle slip angular acceleration which is equal to or greater than a maximum value of the vehicle angular acceleration when the vehicle is in motion and when both the yaw rate sensor YS and the lateral acceleration sensor YG are in the normal condition. If it is determined at Step 403 that the absolute value of the vehicle slip angular acceleration |D(D β)| is lower than the predetermined upper limit value K2, the program proceeds to Step 404 where a second timer T2 is cleared to zero (0), and then the program proceeds to Step 405 where it is determined that both the yaw rate sensor YS and the lateral acceleration sensor YG is the normal condition. Then, the vehicle slip angle β and the vehicle slip angular velocity D β which are used for the oversteer restraining control at the present cycle are renewed to the vehicle slip angle β and the vehicle slip angular velocity D β calculated at Step 109 in FIG. 4 at the present cycle, respectively, and then the program returns to the main routine in FIG. 4.

If it is determined at Step 401 that the absolute value of the vehicle slip angular velocity |D β| is greater than the predetermined upper limit value K1, the program proceeds to Step 407 where the first timer T1 is incremented by 1 (i.e. T1(n)=T1(n−1)+1). "T1(n)" is the first timer at the present cycle and "T1(n−1)" is the first timer at the previous cycle. Next, the program proceeds to Step 408 where the first timer T1 in compared with a predetermined period Tk1 (e.g., 36 msec.). That is, it is determined at Step 408 whether or not the condition in which the absolute value of the vehicle slip angular velocity |D β| is greater than the predetermined upper limit value KI continues more than for the predetermined period Tk1. If it is determined at Step 408 that the first timer T1 is equal to or greater than the predetermined period Tk1, the program proceeds to Step 409 where it is determined that at least one of the yaw rate sensor YS and the lateral acceleration sensor YG is in the abnormal condition, and then the program returns to the main routine in FIG. 4. The abnormal condition of the sensors includes an abnormal condition of the sensors themselves, the disconnection of a leading line (not shown) for connecting the sensors YS, YG to the electronic controller, and other abnormalities.

If it is determined at Step 408 that the first timer T1 is less than the predetermined period Tk1, the program returns to the main routine in FIG. 4 without renewing the vehicle slip angle β and the vehicle slip angular velocity D β to the values at the present cycle. That is, the vehicle slip angle β and the vehicle slip angular velocity D β which are used for the oversteer restraining control at the present cycle are set to the vehicle slip angle β and the vehicle slip angular velocity D β calculated at the cycle immediately before the absolute value of the vehicle slip angular velocity |D β| is greater than the predetermined upper limit value K1 (e.g. the vehicle slip angle β(n−1) and the vehicle slip angular velocity D β(n−1) calculated at the previous cycle). Therefore, the oversteer restraining control is performed based on the vehicle slip angle β and the vehicle slip angular velocity D β calculated at the cycle immediately before |D β| is greater than KI.

If it is determined at Step 403 that the absolute value of the vehicle slip angular acceleration |D (D β)| is lower than the predetermined upper limit value K2, the program proceeds to Step 410 where a second timer T2 is incremented by 1 (i.e. T2(n)=T2(n−1)+1). "T2(n)" is a value of the second timer at the present cycle and "T2(n−1)" is the value of the second timer at the previous cycle. Next, the program proceeds to Step 411 where it is determined whether the second timer T2 is equal to or greater than a predetermined period Tk2 (e.g., 36 msec.). That is, it is determined at Step 411 whether or not the condition in which the absolute value of the vehicle slip angular acceleration |D(D β)| is greater than the predetermined upper limit value K2 continues for more than the predetermined period Tk2. If so, the program proceeds to Step 412 where it is determined that at least one of the yaw rate sensor YS and the lateral acceleration sensor YG is in the abnormal condition, and then the program returns to the main routine in FIG. 4.

If it is determined at Step 411 that the second timer T2 is lower than the predetermined period Tk2, the program returns to the main routine in FIG. 4 without renewing the vehicle slip angle β and the vehicle slip angular velocity D β to the values at the present cycle. That is, the vehicle slip angle β and the vehicle slip angular velocity D β which are used for the oversteer restraining control at the present cycle are set to the vehicle slip angle β and the vehicle slip angular velocity D β calculated at the cycle immediately before the absolute value of the vehicle slip angular acceleration |D(D β)| is greater than the predetermined upper limit value K2. Therefore, the oversteer restraining control is performed based on the vehicle slip angle β and the vehicle slip angular velocity D β calculated at the cycle immediately before |D (D β)| is greater than K2.

The desired slip rate St for the oversteer/understeer restraining control may be amended or changed in response to the coefficient of friction μ against the road surface calculated at Step 108. In this case, at Step 406**, the coefficient of friction μ for use in the oversteer/understeer restraining control at the present cycle is also renewed to the coefficient of friction μ calculated at the present cycle.

Figure 8:
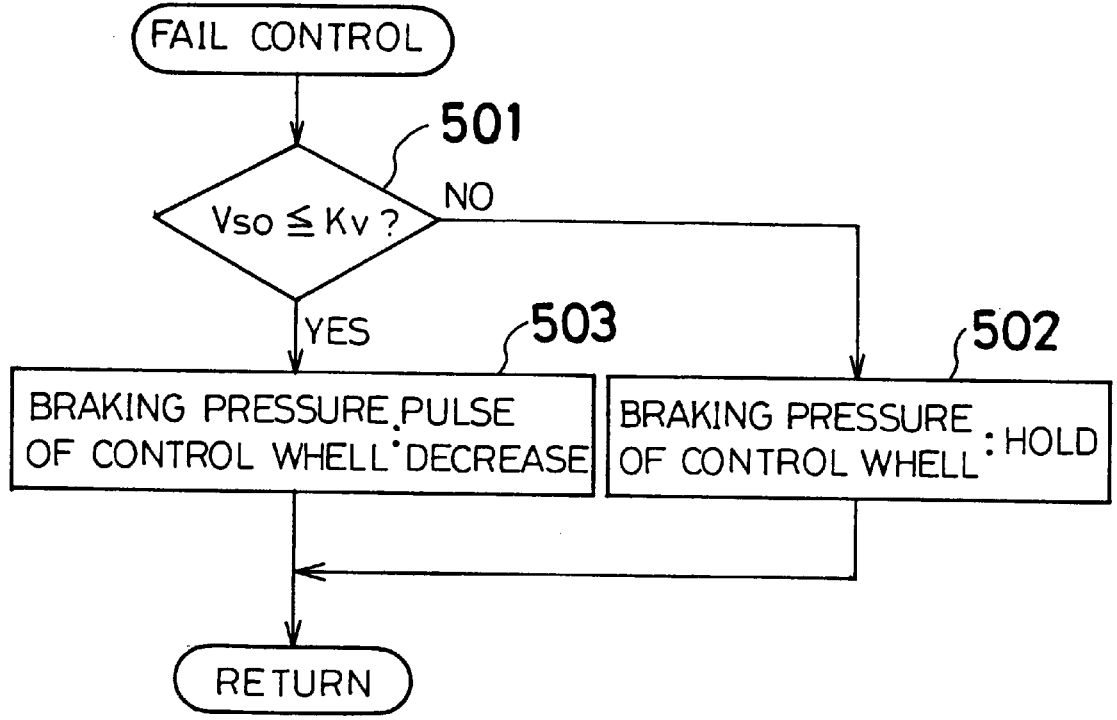
FIG. 8 is a flowchart showing a subroutine for the fail-control shown in FIG. 4.

The fail-control operation carried out in Step 123 in FIG. 4 is explained with reference to FIG. 8.

At Step 501, the vehicle speed Vso is compared with a predetermined value Kv. If the vehicle speed Vso is greater then the predetermined value Kv, the program proceeds to Step 502 where the hydraulic braking pressure for each selected wheel is held. In other words, the hydraulic braking pressure for each controlled wheel is held until the vehicle speed Vso is less than the predetermined value Kv. If the vehicle speed Vso is less than the predetermined value Kv, the hydraulic braking pressure for each selected wheel is pulse-decreased to the hydraulic braking pressure during non-control.

In this embodiment, it is determined that at least one of the yaw rate sensor YS and the lateral acceleration sensor YG is in an abnormal condition when the vehicle slip angular velocity D β is greater than the predetermined upper limit value K1, because the vehicle slip angular velocity D β must be limited to a value lower than the upper limit value K1 by the oversteer restraining control if both of the sensors YS, YG are operating under the normal condition. Therefore, the overseer restraining control can be prevented from being performed inaccurately when at least one of the sensors is in abnormal condition.

Also, since the abnormal condition of the sensors YS and YG is simultaneously determined on the basis of the vehicle slip angular velocity D β, it is not necessary that an abnormal condition detecting mechanism be provided for each sensor. As a result, the system is inexpensive.

Additionally, since it is determined that at least one of the sensors YS, YG is the abnormal condition when the vehicle slip angular velocity Dβ is greater than the upper limit value K1 and the first predetermined period Tk1 has elapsed, the abnormal condition of the sensors YS, YG can be detected more accurately, Further, since it is determined that at least one of the sensors YS, YG is in the abnormal condition when the vehicle slip angular acceleration D (D β) is greater than the predetermined upper limit value K2, the oversteer restraining control can be prevented from being performed inaccurately when at least one of the sensors is experiencing an abnormality.

Further, since the abnormal condition of the sensors YS and YG is simultaneously determined on the basis of the vehicle slip angular acceleration D (D β), it is not necessary that the abnormal condition detecting means is provided for each sensor. As a result, the system is inexpensive.

Further, since it is determined that at least one of the sensors YS, YG is in the abnormal condition when the vehicle slip angular acceleration D (D β) is greater than the upper limit value K2 and when the second predetermined period Tk2 has elapsed, the abnormal condition of the sensors YS, YO can be detected more accurately.

As aforementioned, the abnormal condition of the sensors YS, YG is determined on the basis of the vehicle slip angular velocity D β or the vehicle slip angular acceleration D (D β). However, the abnormal condition of sensors YS, YG may he determined an the basis of the vehicle slip angle β. In this case, it is determined that at least one of the sensors YS, YG is in the abnormal condition when the vehicle slip angle β is greater than a predetermined upper limit value and when a predetermined period has been elapsed.

The principles, various embodiments, and modes of operation of the present invention have been described in the foregoing specification. However, the invention which is intended to be protected is not to be construed as limited to the particular disclosed embodiments. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle motion control system for maintaining stability of a vehicle having a plurality of wheels when the vehicle is in motion, comprising:

braking means for applying a braking force to each wheel of the vehicle;

a lateral acceleration sensor for sensing a lateral acceleration of the vehicle;

a yaw rate sensor for sensing a yaw rate of the vehicle;

slip angular velocity calculation means for calculating a vehicle slip angular velocity on the basis of output signals of the lateral acceleration sensor and the yaw rate sensor;

vehicle motion determination means for determining vehicle motion on the basis of the vehicle slip angular velocity calculated by the slip angular velocity calculation means;

motion control means for actuating the braking means to apply a braking force to at least one of the wheels on the basis of an output of the vehicle motion determination means and irrespective of depression of a brake pedal in order to maintain stability of the vehicle in motion; and sensor condition determination means for determining if at least one of the lateral acceleration sensor and the yaw rate sensor is in an abnormal condition on the basis of the vehicle slip angular velocity calculated by the slip angular velocity calculation means.

2. A vehicle motion control system according to claim 1, wherein the sensor condition determination means determines that said at least one of the lateral acceleration sensor and the yaw rate sensor is in the abnormal condition when the vehicle slip angular velocity calculated by the slip angular velocity calculation means is greater than a first predetermined upper limit value.

3. A vehicle motion control system according to claim 2, wherein the sensor condition determination means determines that said at least one of the lateral acceleration sensor and the yaw rate sensor is in the abnormal condition when the vehicle slip angular velocity calculated by the slip angular velocity calculation means is greater than the first predetermined upper limit value and when a first predetermined time period has elapsed.

4. A vehicle motion control system according to claim 1, further including slip angular acceleration calculation means for calculating a vehicle slip angular acceleration on the basis of the vehicle slip angular velocity calculated by the slip angular velocity calculation means, the sensor condition determination means determining that said at least one of the lateral acceleration sensor and the yaw rate sensor is in the abnormal condition when the vehicle slip angular acceleration calculated by the slip angular acceleration calculation means is greater than a second predetermined upper limit value.

5. A vehicle motion control system according to claim 4, wherein the sensor condition determination means determines said at least one of the lateral acceleration sensor and the yaw rate sensor is in the abnormal condition when the vehicle slip angular acceleration calculated by the slip angular acceleration calculation means is greater than the second predetermined upper limit value and when a second predetermined time period has elapsed.

6. A vehicle motion control system according to claim 1, further including vehicle speed detecting means for detecting a vehicle speed and fail-control means for holding the braking force applied to said at least one of the wheels until the vehicle speed detected by the vehicle speed detecting means is less than the predetermined value, when the sensor condition determination means determines that said at least one of the lateral acceleration sensor and the yaw rate sensor is in the abnormal condition.

7. A vehicle motion control system according to claim 6, wherein the fail-control means decreases the braking force applied to said at least one of the wheels after the vehicle speed detected by the vehicle speed detecting means is less than the predetermined value.

8. A vehicle motion control system according to claim 1, wherein the vehicle motion determination means determines if an excessive oversteer occurs on the basis of the vehicle slip angular velocity calculated by the slip angular velocity calculation means.

9. A vehicle motion control system according to claim 1, wherein the motion control means includes:

desired slip rate setting means for setting a desired slip rate for said at least one of the wheels in accordance with the vehicle motion determined by vehicle motion determination means;

actual slip rate measuring means for measuring an actual slip rate of said at least one of the wheels;

slip rate deviation calculation means for calculating a deviation between the desired slip rate and the actual slip rate; and control means for controlling the braking means to apply a braking force to said at least one of the wheels on the basis of the deviation calculated by the slip rate deviation calculation means.

10. A vehicle motion control system according to claim 1, wherein the braking means includes:

wheel brake cylinders operatively connected to respective wheels for applying a braking force;

a braking pressure generator for supplying a braking pressure to the wheel brake cylinders; and actuating means disposed between the braking pressure generator and the wheel brake cylinders for controlling the braking pressure in the wheel brake cylinders.

11. A vehicle motion control system according to claim 10, wherein the braking pressure generator includes a master cylinder for generating the braking pressure in response to depression of the brake pedal, and an auxiliary pressure source for generating the braking pressure irrespective of depression of the brake pedal.

12. A vehicle motion control system for maintaining stability of a vehicle having a plurality of wheels when the vehicle is in motion, comprising:

braking means for applying a braking force to each wheel of the vehicle;

a lateral acceleration sensor for sensing a lateral acceleration of the vehicle;

a yaw rate sensor for sensing a yaw rate of the vehicle;

slip angular velocity calculation means for calculating a vehicle slip angular velocity on the basis of output signals of the lateral acceleration sensor and the yaw rate sensor;

slip angular acceleration calculation means for calculating a vehicle slip angular acceleration on the basis of the vehicle slip angular velocity calculated by the slip angular velocity calculation means;

vehicle motion determination means for determining vehicle motion on the basis of the vehicle slip angular velocity calculated by the slip angular velocity calculation means;

motion control means for actuating the braking means to apply a braking force to at least one of the wheels on the basis of an output of the vehicle motion determination means and irrespective of depression of a brake pedal in order to maintain stability of the vehicle in motion; and sensor condition determination means for determining if at least one of the lateral acceleration sensor and the yaw rate sensor is in an abnormal condition on the basis of the vehicle slip angular acceleration calculated by the slip angular acceleration calculation means.

13. A vehicle motion control system according to claim 12, wherein the sensor condition determination means determines that said at least one of the lateral acceleration sensor and the yaw rate sensor is in the abnormal condition when the vehicle slip angular acceleration calculated by the slip angular acceleration calculation means is greater than a first predetermined upper limit value.

14. A vehicle motion control system according to claim 12, wherein the sensor condition determination means determines that said at least one of the lateral acceleration sensor and the yaw rate sensor is in the abnormal condition when the vehicle slip angular acceleration calculated by the slip angular acceleration calculation means is greater than a first predetermined upper limit value and when a first predetermined time period has elapsed.

15. A vehicle motion control system according to claim 12, further including vehicle speed detecting means for detecting a vehicle speed and fail-control means for holding the braking force applied to said at least one of the wheels until the vehicle speed detected by the vehicle speed detecting means is less than the predetermined value, when the sensor condition determination means determines that said at least one of the lateral acceleration sensor and the yaw rate sensor is in the abnormal condition.

16. A vehicle motion control system according to claim 12, wherein the motion control means includes:

desired slip rate setting means for setting a desired slip rate for said at least one of the wheels in accordance with the vehicle motion determined by vehicle motion determination means;

actual slip rate measuring means for measuring an actual slip rate of said at least one of the wheels;

slip rate deviation calculation means for calculating a deviation between the desired slip rate and the actual slip rate; and control means for controlling the braking means to apply a braking force to said at least one of the wheels on the basis of the deviation calculated by the slip rate deviation calculation means.

* * * * *

UNITED STATES PATENT AND TRADEMARK OFFICE
CERTIFICATE OF CORRECTION

PATENT NO. : 5,931,546
DATED : August 3, 1999
INVENTOR(S) : H. NAKASHIMA, et al.

It is certified that error appears in the above-indentified patent and that said Letters Patent is hereby corrected as shown below:

On the title page, add item:

[30] Foreign Application Priority Data

Oct. 25, 1996  [JP]  Japan .................... 8-284301

Signed and Sealed this

Sixth Day of March, 2001

Attest:

NICHOLAS P. GODICI

Attesting Officer

Acting Director of the United States Patent and Trademark Office